Oct. 3, 1939.  E. RIEMENSCHNEIDER ET AL  2,174,928
APPARATUS FOR ELECTRIC WELDING
Filed April 9, 1936   2 Sheets-Sheet 1
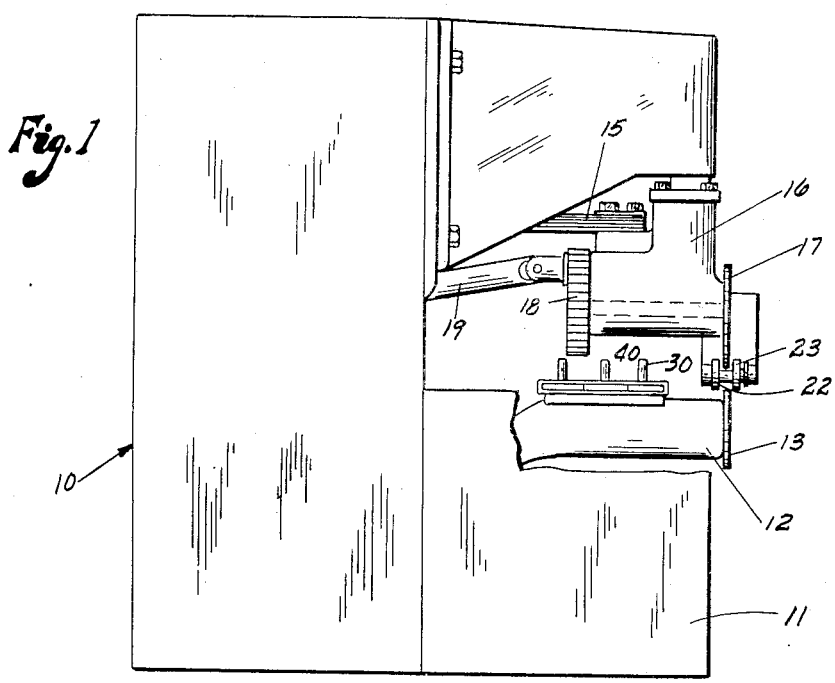
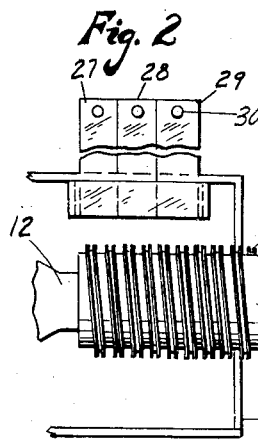
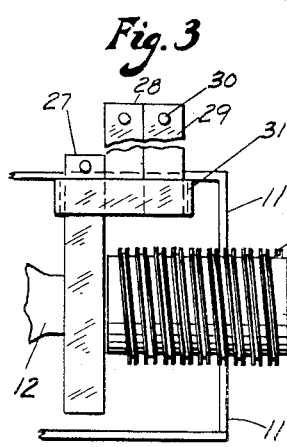
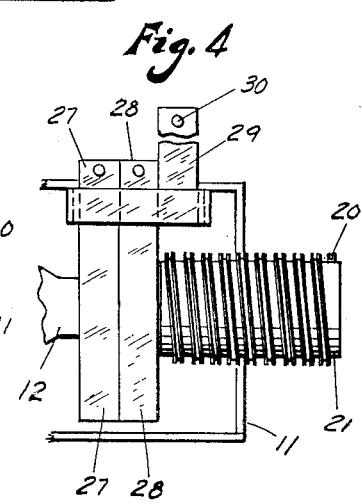
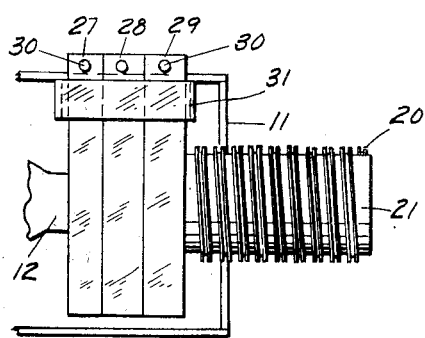
INVENTOR.
ARNIM W. LUEDTKE &
ERNEST RIEMENSCHNEIDER
BY
ATTORNEY.

Oct. 3, 1939.   E. RIEMENSCHNEIDER ET AL   2,174,928
APPARATUS FOR ELECTRIC WELDING
Filed April 9, 1936   2 Sheets-Sheet 2
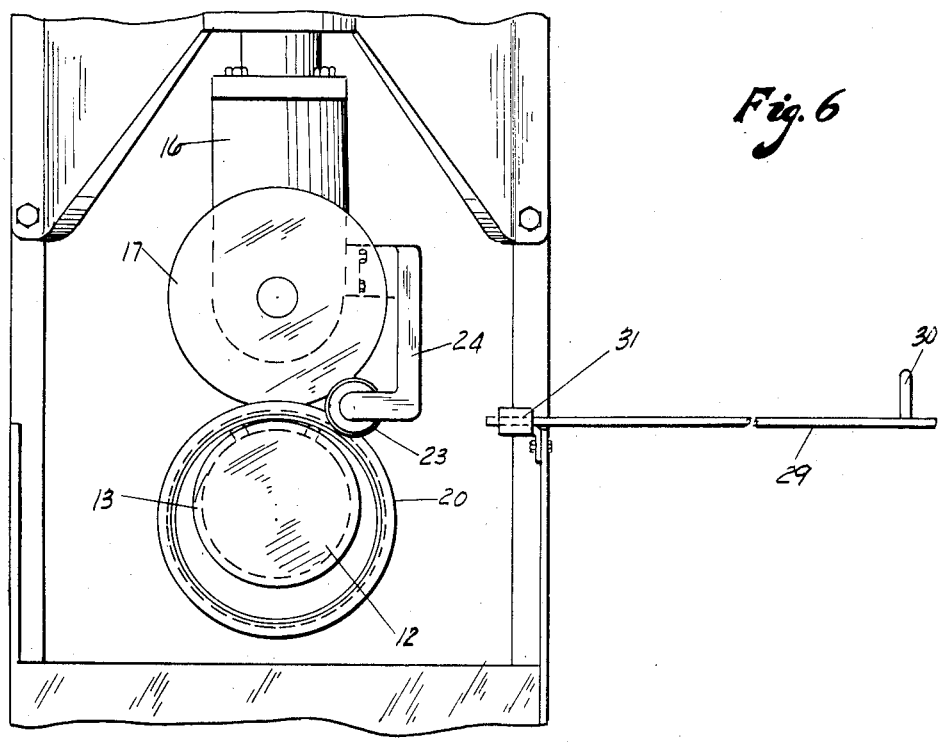
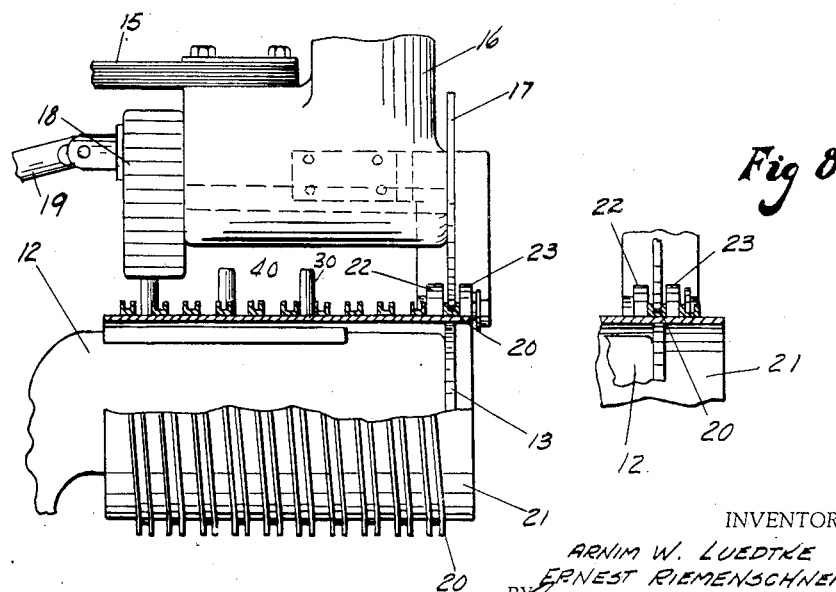
INVENTOR.
ARNIM W. LUEDTKE &
ERNEST RIEMENSCHNEIDER
BY
ATTORNEY.

Patented Oct. 3, 1939

2,174,928

UNITED STATES PATENT OFFICE 2,174,928

APPARATUS FOR ELECTRIC WELDING

Ernest Riemenschneider, Lakewood, and Arnim W. Luedtke, Cleveland, Ohio, assignors to The Midland Steel Products Company, Cleveland, Ohio, a corporation of Ohio Application April 9, 1936, Serial No. 73,552

3 Claims. (Cl. 219—4)

This invention relates to new and useful improvements in a method and apparatus for electric welding.

An object of the invention is to provide a method and apparatus for maintaining the welding current substantially constant throughout the welding operation.

Another object of the invention is to provide a method and apparatus for maintaining the welding circuit impedance substantially constant throughout the welding operation.

A further object of the invention is to provide means for maintaining a constant value of welding current by maintaining a substantially constant amount of magnetizable material in the work gap throughout the welding operation.

Another object of the invention is to provide means for progressively inserting magnetizable metal in the field of the welding circuit to compensate for the metal being welded as the latter moves out of the field of the welding circuit, whereby substantially the same amount of metal is in the field of the welding circuit throughout the welding operation.

Other objects and advantages of the invention will become apparent during the course of the following description.

In the accompanying drawings forming a part of the application and wherein like numerals are employed to designate like parts throughout the several views, Fig. 1 is an elevational view of an electric welding machine including impedance controlling members.

Fig. 2 is a broken plan view showing a cylinder and fin to be welded thereto, the means for controlling the impedance and welding current being out of the field of the welding circuit.

Figs. 3 through 5 show the current controlling means progressively inserted in the work gap or field of the welding circuit to compensate for the movement of the cylinder out of the field of the welding circuit as the fin is welded to the cylinder.

Fig. 6 is a fragmentary front elevational view of the welding machine showing the cylinder on the lower electrode and the current controlling means arranged out of the welding circuit field.

Fig. 7 is an elevational view partly in section to illustrate the relation of the fin and cylinder to the upper and lower electrodes, and Fig. 8 is an elevational view of the means for spacing and feeding the fin in a helix about the shell during the welding operation.

Referring to the drawings in detail, numeral 10 designates a suitable welding machine comprising a casing 11 in which is disposed a transformer, not shown, having the lower lead of its secondary winding connected to a fixed elongated cylindrical horn 12 to which is rotatably mounted a disk electrode 13. The upper lead 15 of the secondary winding is electrically connected to a welding head 16 adapted to be reciprocated vertically to move a rotatably mounted upper electrode 17 in vertical alignment with respect to the lower electrode 13. The upper electrode 17 is rotated by means of suitable gear means 18 and a shaft 19 adapted to be rotated by power means arranged in the casing 11.

The parts to be welded together are of magnetizable material and are herein shown as a heat radiating fin 20 of channel configuration and a cylinder 21, the ends of which may be closed to form a generator for an absorption type of mechanical refrigerator. The fin 20 is properly spaced on the cylinder 21 during the welding operation by means of journaled disks 22 and 23 carried by a block 24 secured to the welding head 16 and the flanges of the fin 20 pass between the disks as the fin 20 is being welded to the cylinder 21.

Alternating current is transmitted through a welding circuit including the lower secondary winding of the transformer, the horn 12, lower electrode 13, cylinder 21, fin 20, and the upper electrode 17 to the upper terminal 15 of the secondary.

In order to control the impedance and current of the welding circuit we have provided a plurality of flat metallic bars 27, 28 and 29 of magnetizable material, each of which is provided with a handle 30. The bars are slidably supported on a block 31 carried by the casing 11 and are adapted to be manually moved into the work gap, indicated at 40, above and across the lower horn 12 into the field of the welding circuit.

In operation, assuming that the current controlling bars are disposed out of the field of the welding circuit as shown in Fig. 2 and that the fin 20 is spirally and loosely wound about the cylinder 21, the latter is then placed in the work gap of the welding machine as shown in Fig. 7. The upper electrode 17 is inserted in the channel of the fin 20 and exerts sufficient pressure thereon that upon rotation of the upper electrode the fin 20 and cylinder 21 will be rotated between the upper and lower electrodes.

At the beginning of the welding operation the entire length of the cylinder 21 embraces the horn 12 and the impedance of the welding circuit is relatively high due to the fact that a large amount of magnetizable material, that is, the full longitudinal length of the cylinder 21, is disposed in the work gap 40 and in the field of the welding circuit. As the welding progresses the cylinder 21 moves out of the work gap 40 to the right as viewed in Figs. 2 through 5 and the amount of magnetizable material in the work gap, or disposed in the field of the welding circuit, is decreased which reduces the impedance of the welding circuit, and under these conditions as the impedance in the welding circuit decreases the welding current is likely to be increased to a value that will burn the weld. This decrease in welding circuit impedance is compensated for by moving the magnetizable bar 27 into the range of the magnetic field of the welding circuit, that is into the work gap 40 across and above the lower horn 12, as shown in Fig. 3. Accordingly substantially the same amount of magnetizable material is in the field of the welding circuit as at the beginning of the weld, and the welding circuit impedance is substantially the same as at the beginning of the weld. When the welding operation has progressed to the position shown in Fig. 4, the impedance bar 28 is inserted into the field of the welding circuit as shown; and when the fin 20 has been welded to the cylinder 21 to the position illustrated in Fig. 5 the remaining impedance bar 29 is moved into the field of the welding circuit.

From the foregoing it will be perceived that the value of the welding current is maintained substantially constant throughout the welding operation by inserting impedance bars 27, 28 and 29 into the field of the welding circuit as the weld progresses to compensate for the portion of the cylinder 21 that has moved out of the welding circuit field and work gap, whereby the welding current and welding circuit impedance is maintained substantially constant throughout the weld.

If it is desired to reverse the welding process that is, to feed the cylinder and fin on to the horn 12, into the field of the welding circuit the initial position of the impedance bars will be as shown in Fig. 5. As the welding proceeds, the bar 29 is first removed from the field of the welding circuit and the fin progressively welded on to the cylinder until the latter is in the position indicated in Fig. 4. As the weld progresses the impedance bars 28 and 27 are successively removed from the welding circuit field until the cylinder is in the position shown in Fig. 2 in which position the cylinder is in the field of the welding circuit and maintains the welding circuit impedance and welding current at substantially the same value as at the beginning of the weld.

It will be obvious that this method of welding will prevent a substantial increase in welding current as the welding progresses and thereby eliminates the danger of burning the weld.

It will also be understood that various changes in the size, shape and arrangement of parts may be restorted to without departing from the spirit of the invention or the scope of the appended claims.

We claim:

1. In an electric welding machine having a transformer for welding channel section spiral fins on cylinders, a pair of horns connected to the secondary of the transformer and defining a magnetic field therebetween when current flows in said secondary, a pair of roller electrodes mounted on the ends of said horns, one roller electrode engaging the inside of the cylinder and the other engaging the channel of the fin to rotate the cylinder, a pair of guide rolls mounted at opposite sides of the last named roller electrode to engage opposite sides of the channel fin and cause the cylinder to be progressively moved longitudinally and away from the influence of the magnetic field as the cylinder is rotated, and magnetic means movable into said field as the cylinder moves out of the same.

2. In an electric welding machine having a transformer for welding channel section spiral fins on cylinders, a pair of horns connected to the secondary of the transformer and defining a magnetic field therebetween when the current flows in said secondary, a pair of roller electrodes mounted on the ends of said horns, one roller electrode engaging the inside of the cylinder and the other engaging the channel of the fin to rotate the cylinder, a pair of guide rolls mounted at opposite sides of the last named roller electrode to engage opposite sides of the channel fin and cause the cylinder to be progressively moved longitudinally and away from the influence of the magnetic field as the cylinder is rotated, and a plurality of magnetizable bars individually movable into said field transversely of the axis of the cylinder as the cylinder moves out of the field.

3. In an electric welding machine having a transformer for welding channel section spiral fins on cylinders, a pair of horns connected to the secondary of the transformer and defining a work space therebetween, a pair of roller electrodes mounted on the ends of said horns, one roller electrode engaging the inside of the cylinder and the other engaging the channel of the fin to rotate the cylinder, and a pair of guide rolls mounted at opposite sides of the last named roller electrode to engage opposite sides of the channel fin and cause the cylinder to be progressively moved longitudinally and out of said space as the cylinder is rotated.

ERNEST RIEMENSCHNEIDER.
ARNIM W. LUEDTKE.